United States Patent [19]

Maier et al.

[11] Patent Number: 5,593,112
[45] Date of Patent: Jan. 14, 1997

[54] NACELLE AIR PUMP FOR VECTOR NOZZLES FOR AIRCRAFT

[75] Inventors: Mark S. Maier, West Palm Beach; Eric J. Gamble, Jupiter; Jack W. Wilson, West Palm Beach; Eliott L. Calzadilla, North Palm Beach, all of Fla.; Gerald F. Goetz, Seattle, Wash.

[73] Assignee: United Technologies Corporation, Hartford, Conn.

[21] Appl. No.: 349,844

[22] Filed: Dec. 6, 1994

[51] Int. Cl.$^6$ .................................................... B64C 30/00
[52] U.S. Cl. ................. 244/117 A; 244/207; 417/76; 417/78; 239/127.3; 239/127.1; 60/266
[58] Field of Search ............................ 244/117 A, 207; 417/76, 78; 239/127.3, 127.1, 265.17; 60/266

[56] References Cited

U.S. PATENT DOCUMENTS

| | | | |
|---|---|---|---|
| 3,469,787 | 9/1969 | Marsh et al. | 239/127.3 |
| 3,682,269 | 8/1972 | Jumelle | 239/265.17 |
| 4,718,870 | 1/1988 | Watts | 239/265.17 |
| 4,800,718 | 1/1989 | Zimmerman | 239/265.17 |
| 5,014,932 | 5/1991 | Drittmyer | 244/117 A |
| 5,255,849 | 10/1993 | Mayer et al. | 239/127.3 |

Primary Examiner—Andres Kashnikow
Assistant Examiner—Tien Dinh
Attorney, Agent, or Firm—Norman Friedland

[57] ABSTRACT

The nacelle of the aircraft is purged and the sidewall of the vector nozzles of the gas turbine engine in the nacelle is cooled by utilizing the engine fan air to drive ejector pumps mounted in series flow relationship, a rectangular mixing zone and a diffuser with a rectangular cross section and a step in the exhaust nozzle gaspath. This results in minimizing the amount of fan air for driving the system and enhancing engine thrust and enhanced sidewall cooling because the temperature of the mixed air is lower than heretofore known systems.

15 Claims, 4 Drawing Sheets

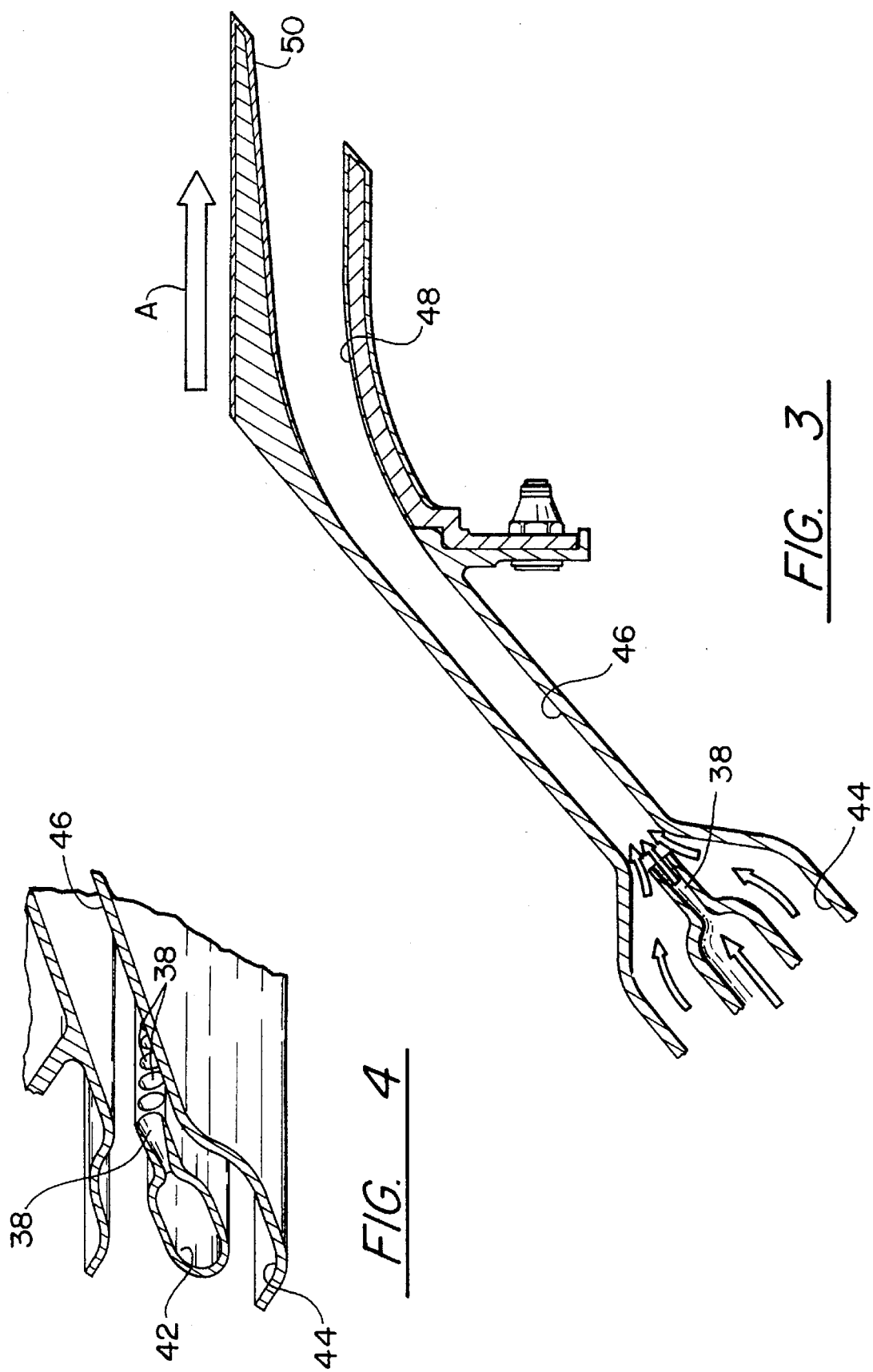

NACELLE AIR PUMP FOR VECTOR NOZZLES FOR AIRCRAFT

This invention was made under a U.S. Government contract and the Government has rights herein.

CROSS REFERENCES

The following patent applications filed on even date relate to this patent application and all are commonly assigned to United Technologies Corporation:

Application Ser. No. 08/349,847, filed Dec. 6, 1994, entitled "Blind Assembly-Swivel Crossover Tube" invented by Mark Stefan Maier.

Application Ser. No. 08/349,846, filed Dec. 6, 1994, entitled "Exhaust Nozzle Cooling Scheme for Gas Turbine Engine" invented by Daniel E. Eigenbrode and Erik A. Lindstrom.

Application Ser. No. 08/349,843, filed Dec. 6, 1994, entitled "Aircraft Nacelle Ventilation and Exhaust Nozzle Cooling" invented by Douglas A. Thonebe and Russell L. Coons.

TECHNICAL FIELD

This invention relates to aircraft engine vector nozzles and particularly to an air pump system mounted in the nozzle's side wall for purging the nacelle of the aircraft and cooling the aircraft nozzle's and/or the aircraft's side walls.

BACKGROUND ART

As is well known in aircraft technology, it is abundantly important to prevent gasses escaping from the aircraft engine from migrating into the nacelle and accumulating to the point where the gasses would combust and either cause fires or explosions. It is customary to purge the nacelle so as to avoid such occurrences. Current techniques for purging the nacelle is to locate a pump adjacent to the exhaust nozzle or at the front of the nacelle and purge the air that is contained in the nacelle through exhaust ports located at the tail end of the aircraft. Obviously, this entails pressurizing the stagnated gasses to assure that the proper exhaust flow is maintained throughout the operating envelope of the aircraft. The increase in pressure requires larger pumping apparatus resulting in heavier support structure that is necessary to attain the structural integrity of the aircraft and the engine parts which increases overall system weight and hence, incurs an engine operating performance deficit.

One type of pump heretofore utilized for this purpose is an ejector pump that utilizes fan discharge air as the primary fluid and dumps the entrained nacelle air directly overboard. The use of fan air for this purpose and in this manner penalizes engine performance as the fan air would otherwise be used for generating thrust.

Also well known in this technology is that there is concern in expending the cooling air after it has accomplished its cooling and ventilating functions. Ideally, it is desirable to dump the spent air into the gas path without incurring a penalty or more importantly to utilize any remaining energy in the spent air to augment the engine's thrust. It is also important in this technology to pump nacelle cooling air at flow rates and pressures sufficient to be entrained into the nozzle gaspath flow for sidewall cooling. Typically, one of two sources have heretofore been utilized for sidewall cooling. One of the sources is the fan air which is at a pressure higher than required to drive the flow and is also at relatively high temperatures which results in poor cooling and as mentioned above comes at the expense of engine performance. When fan air is used for cooling, the pressure must be throttled to minimize delta pressure ($\Delta P$) across the cooling liner. Thus, the energy that is used to raise the pressure of the fan air is essentially wasted when the pressure is reduced back to the required level. The other source is the ambient air that is entrained in the nacelle which has sufficiently low temperatures that would provide efficient cooling, but its pressure is too low for it to penetrate into the engine's gas path and flow therein.

We have found that we can obviate the problems enumerated in the above paragraphs and obtain sufficient sidewall cooling and nacelle purging without unduly sacrificing engine performance. The invention contemplates a supersonic jet pump using two ejectors in series that minimizes utilization of fan air and maximizes use of ambient air to attain sufficient flows at the required pressure level and including means for discretely dumping the cooling air in the gaspath.

SUMMARY OF THE INVENTION

An object of this invention is to provide improved sidewall cooling for the exhaust nozzle of a gas turbine engine and provide adequate flow through the nacelle so as to prevent fires and explosions from occurring.

A feature of this invention is the utilization of a relatively long tubular booster pump with a series of axisymmetric supersonic nozzles and a mixing zone. The mixing zone is configured in a rectangular shape. A diffuser with a rectangularly shaped cross section and a step in the nozzle gaspath is provided.

A feature of this invention is to utilize fan discharge air to drive the pump and entrained ambient or nacelle air as the secondary flow for obtaining the desired pressure and flow for continuous sidewall cooling. In this manner, the energy from the fan air is efficiently transferred to the secondary nacelle air, minimizing the losses while maximizing the payoff in the design.

The foregoing and other features of the present invention will become more apparent from the following description and accompanying drawings.

BRIEF DESCRIPTION OF DRAWINGS

FIG. 3 is a sectional view of the jet pump of this invention;

FIG. 4 is a fragmentary view showing a portion of the embodiment depicted in FIG. 3.

BEST MODE FOR CARRYING OUT THE INVENTION

While the preferred embodiment illustrates this invention as being utilized in particular exhaust nozzle mounted in aircraft, as one skilled in this art will appreciate this invention has utility for use in all types of exhaust nozzles where it is desired to efficiently cool the structural components down stream of the nozzle throat plane. In the context of this patent application it is to be understood that the term "sidewall" is intended to include the sidewall of the nozzle, extended nozzle and/or of the aircraft depending on the particular application where this invention is utilized.

Figure 5:
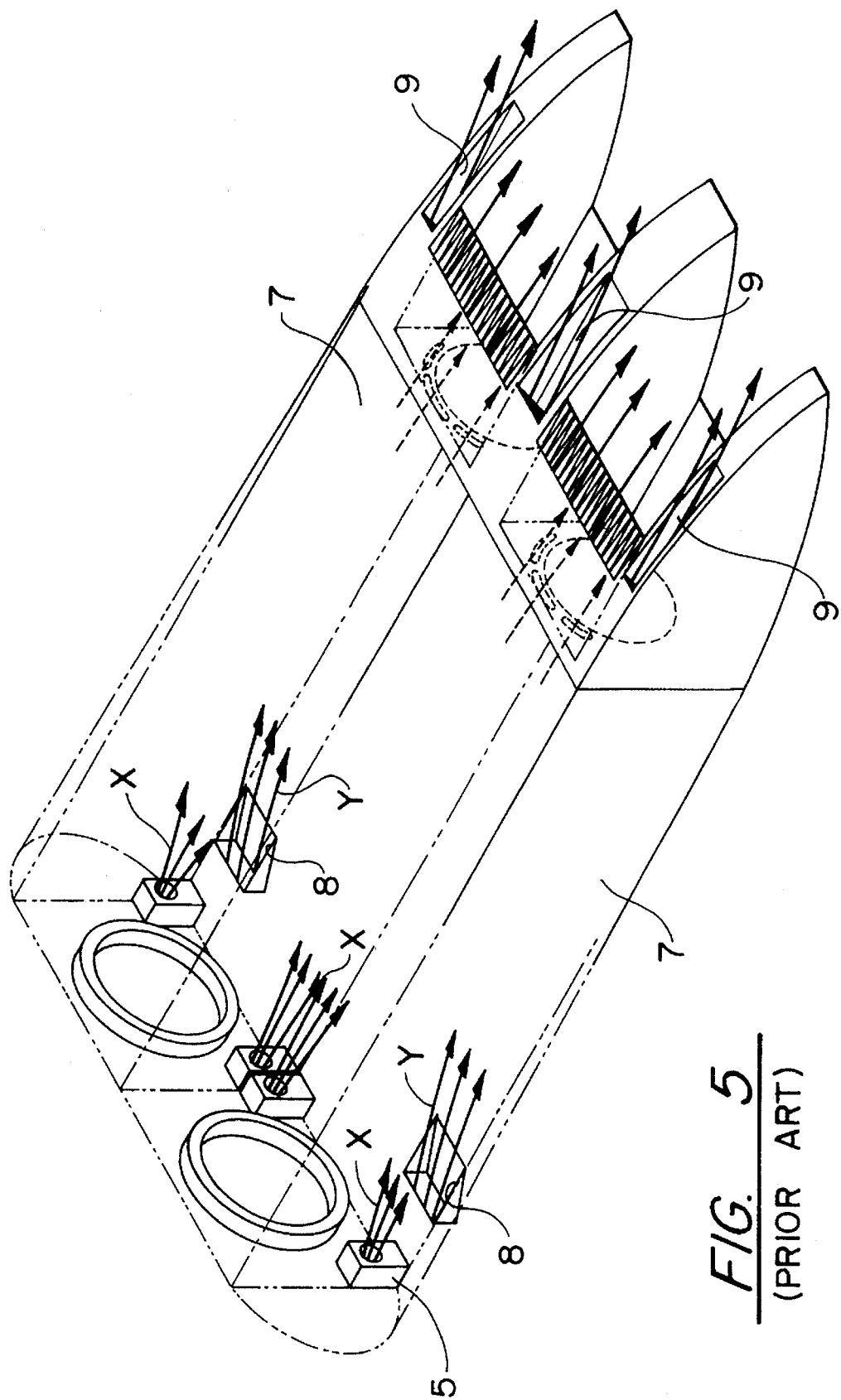
FIG. 5 is a perspective view, partly in phantom illustrating flow paths in the prior art configuration of the exhaust nozzle of a gas turbine engine and the sidewalls of an aircraft.

The invention can best be appreciated by referring to FIG. 5 which shows partly in perspective and partly in phantom the flow pattern typically used in the past for venting the nacelle of the aircraft adjacent the exhaust nozzle. As noted in FIG. 5 the fan air/nacelle air mixture, indicated by reference letter X, is discharged from the ejector pumps 5 (which may be axisymmetric ejectors) and pressurizes the nacelle 7 to purge the secondary air. At sufficiently high flight Mach Numbers, ambient air (indicated by reference letter Y) may be introduced to the nacelle through scoops 8 and discharged overboard without performing any cooling through the vents 9. A separate cooling system, requiring additional fan air for cooling the sidewalls, must also be provided to maintain structural integrity of the materials.

Figure 1:
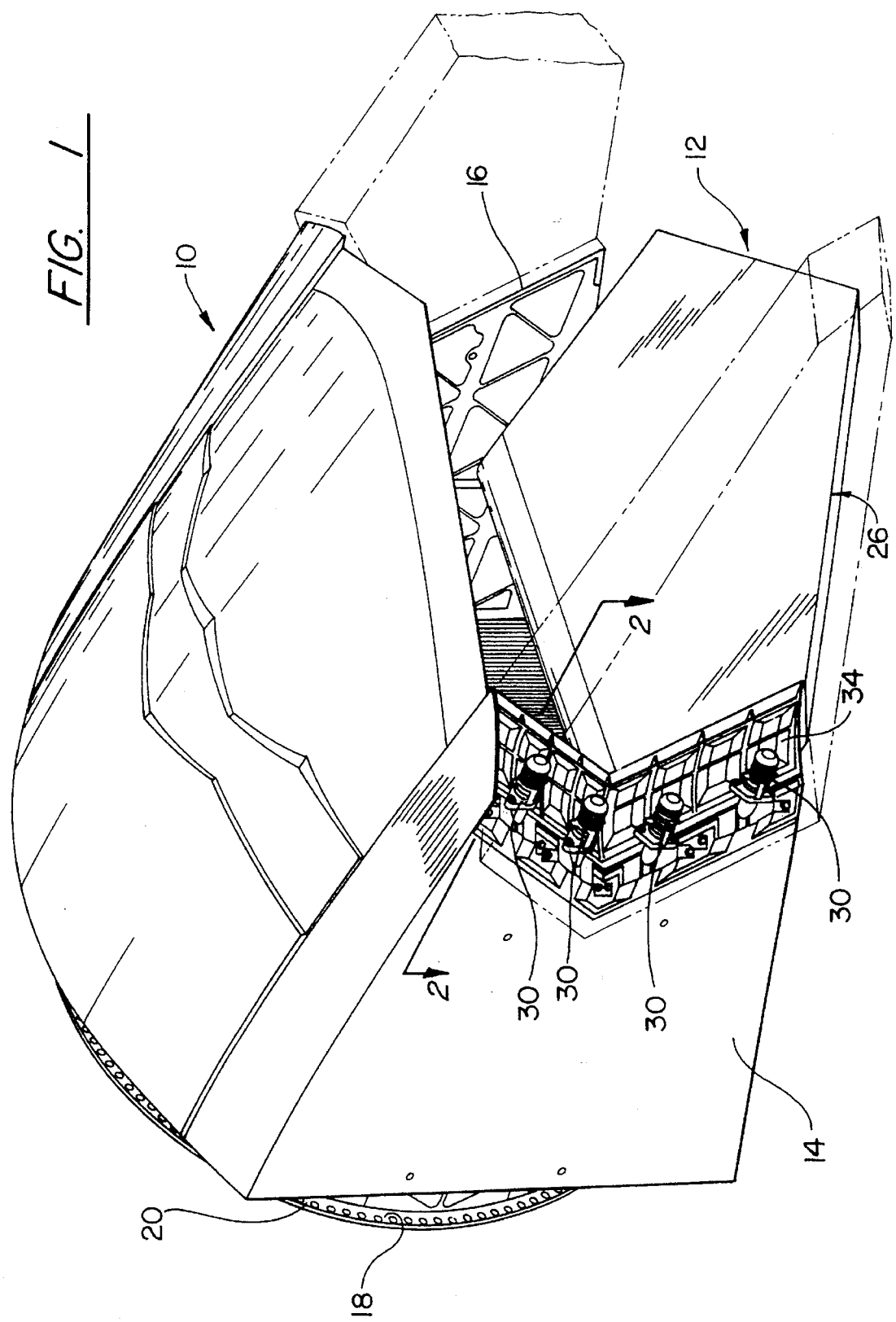
FIG. 1 is a fragmentary view in perspective with a cutout illustrating the pump housing installed in a 2-dimensional nozzle.

In contrast, this invention combines the systems for purging the nacelle and cooling the sidewalls to minimize the required amount of fan air and the associated loss of energy. The 2-dimensional exhaust nozzle utilizing this invention is illustrated in FIG. 1 which shows the exhaust nozzle assembly 10 comprising external exhaust duct generally illustrated by the reference numeral 12. Exhaust nozzle assembly 10 includes sidewalls 14, 16 which fair into an upstream transition duct 18. The duct 18 has a circular inlet 20. The nozzle assembly 10 further includes upper and lower flap assemblies 26, each comprising a suitable and well known convergent flap and divergent flap, a downstream external fairing flap and an associated upstream external fairing flap. For more details of the two-dimensional exhaust nozzle reference should be made to U.S. Pat. No. 4,690,329 granted on Sep. 1, 1987 to W. M. Madden and assigned to United Technologies Corporation, the assignee common to the assignee of this patent application and incorporated herein by reference.

As noted in FIG. 1, a portion of the sidewall 16 is cut away to illustrate the pumping housing that is attached to the side wall of the aircraft where one end of each of the plurality of crossover tubes generally illustrated by reference numeral 30 is attached. In this instance four crossover tubes 30 are mounted in the sidewall 14 and another four (not shown) are mounted in the sidewall 16.

Figure 2:
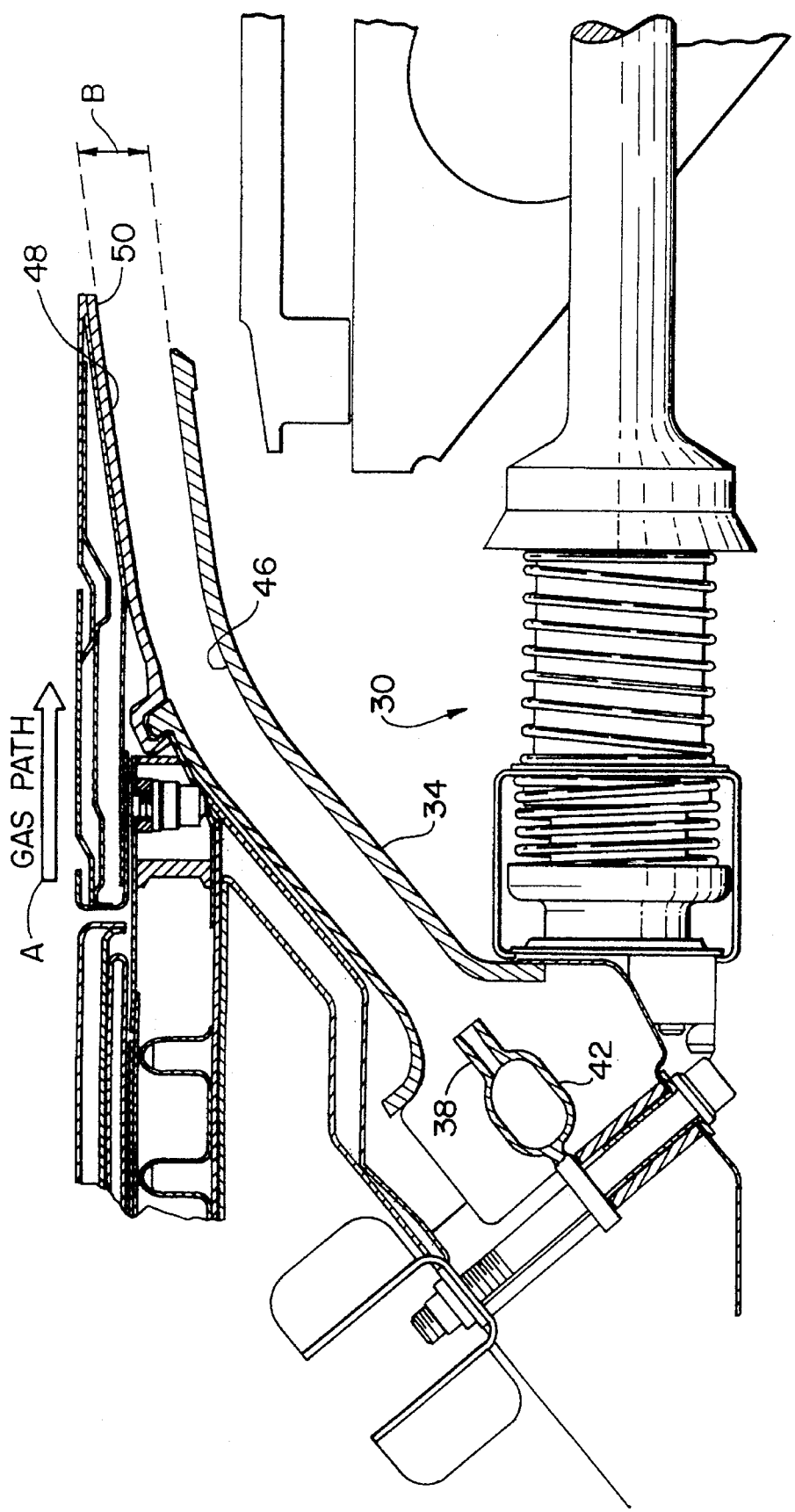
FIG. 2 is a fragmentary view in section illustrating the details of this invention.

As best seen in FIGS. 2–4 and in accordance with this invention, the tubular shaped ejector pump generally illustrated by reference numeral 34 consists of a series of laterally disposed axisymmetric supersonic nozzles 38, the rectangular configured mixing zone 46 and the rectangular cross section diffuser 48. The discharge end of the ejector pump 50 is configured to form a step change in the sidewall defining the boundary of the gas path to cause a sudden expansion thereof so as to dump the mixed fluids from the ejector pump directly into the gas path as will be explained in more detail hereinbelow. While in the preferred embodiment for optimum operation of the this system nozzles 38 is supersonic, as one skilled in this art will appreciate other less demanding systems could use a sonic or subsonic nozzle instead of the supersonic nozzle.

The fan discharge air that is conducted through various passages (not shown) in the engine is directed through the passage and flows into a manifold 42 for powering the ejector pump nozzles 38. This flow is accelerated through these supersonic nozzles 38 in order to lower the static pressure. This low static pressure together with the interface shear friction between the high velocity fan air and the low velocity nacelle air entrained in the cavity 44 induces the nacelle air into the rectangular shaped mixing zone 46. This flow goes through a series of shocks in the mixing zone 46 until the velocity of the flow is reduced to a subsonic flow. It is during this mixing process that energy is transferred from the high pressure air to the low pressure air with a minimal loss. This subsonic flow of mixed fan and nacelle air is next diffused in the diffuser 48 to attain the optimum static pressure and relative velocities for interface friction between the gaspath flow indicated by the arrow A and the mixed flow. In order for the diffused mix flow to penetrate into the gaspath, the discharge end 50 that terminates in the sidewall that defines the gaspath boundary, forms a step B, as best seen in FIG. 2. which causes the gasses in the gaspath to undergo a sudden expansion. This expansion, in turn, reduces the local static pressure of the gasses in the gaspath at the step B which allows the mixed gasses discharging from the diffuser 48 to discharge into the gas path. Thus, since the pressure in diffuser 48 is higher than the ambient pressure, the end 50 serves as an ejector that is in series flow relationship with nozzle 38, providing the desired pressure level of the cooling air discharging into the gaspath. The pressure is such that the cooling air when discharging in the gaspath does not penetrate the stream of the gaspath but rather flows in a sheet of cooling air that blankets the exposed surface of the sidewall.

As is apparent from the foregoing this mixed flow serves to cool the sidewall in addition to assuring a constant flow through the nacelle to avoid the stagnation of gasses emitted by the engine. By minimizing the amount of fan air used to drive the system in contrast to the heretofore known systems, this invention affords two advantages. Namely, reducing the amount of fan air bled from the engine results in higher engine thrust and the mixed flow dumped to the gaspath for sidewall cooling is at a lower temperature resulting in a more effective cooling.

What has been shown by this invention is an effective venting and cooling system for the nacelle and sidewalls of the 2-dimensional engine's exhaust nozzles by utilizing the nacelle air to cool the sidewalls. The long rectangular profile that pumps directly to the gas path capitalizes on lowering the gaspath static pressure to reduce the amount of fan air required to run the system while producing a uniform flow field for sidewall cooling. The long tubular booster pump with supersonic nozzles allows for a large volume of nacelle air to be moved to the sidewall for cooling while maintaining a compact configuration for enhanced packaging.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For aircraft having a nacelle and sidewalls, a gas turbine engine mounted in said nacelle, a source of fan air from the gas turbine engine, and a two-dimensional exhaust nozzle disposed adjacent said sidewalls mounted on said gas turbine engine, means for purging the nacelle and cooling the side walls comprising a booster pump attached to said sidewalls upstream of the discharge end of said two-dimensional exhaust nozzle, first nozzle means in said booster pump driven by the fan air, a mixing chamber for mixing air in said nacelle with said fan air, a diffuser attached to said mixing chamber, a second nozzle in series flow relationship with said first nozzle means disposed on the end of said diffuser, and a step defined by said sidewall and said second nozzle for reducing the static pressure of the gaspath for laying a blanket of cooling air adjacent the exposed surface of said sidewalls whereby said nacelle is continuously being purged and said sidewalls are continuously being cooled when the gas turbine engine is in operation.

2. For aircraft having a nacelle and side walls, a gas turbine engine mounted in said nacelle, a source of fan air from the gas turbine engine, and a two-dimensional exhaust nozzle disposed adjacent said side walls mounted on said gas turbine engine as claimed in claim 1 wherein said first nozzle means comprises of a plurality of supersonic nozzles.

3. For aircraft having a nacelle and side walls, a gas turbine engine mounted in said nacelle, a source of fan air from the gas turbine engine, and a two-dimensional exhaust nozzle disposed adjacent said sidewalls mounted on said gas turbine engine as claimed in claim 2 wherein said supersonic nozzles are axisymmetrical.

4. For aircraft having a nacelle and sidewalls, a gas turbine engine mounted in said nacelle, a source of fan air from the gas turbine engine, and a two-dimensional exhaust nozzle disposed adjacent said sidewalls mounted on said gas turbine engine as claimed in claim 3 wherein said diffuser is rectangularly configured in cross section.

5. For aircraft having a nacelle and sidewalls, a gas turbine engine mounted in said nacelle, a source of fan air from the gas turbine engine, and a two-dimensional exhaust nozzle disposed adjacent said sidewalls mounted on said gas turbine engine as claimed in claim 4 wherein said mixing chamber is rectangularly configured.

6. For aircraft having a nacelle and sidewalls, a gas turbine engine mounted in said nacelle, a source of fan air from the gas turbine engine, and a two-dimensional exhaust nozzle disposed adjacent said sidewalls mounted on said gas turbine engine as claimed in claim 5 wherein said booster pump is relatively long.

7. Means for purging the nacelle of aircraft and for cooling the sidewalls of said aircraft, a gas turbine engine mounted in said nacelle, a source of fan air from the gas turbine engine, and a two-dimensional exhaust nozzle disposed adjacent to said sidewalls mounted on said gas turbine engine, said sidewalls comprising a liner defining the boundary for the gaspath of said engine, a relatively long booster pump comprising a plurality of ejector nozzles communicating with said fan air for driving said plurality of ejector nozzles, a mixing zone adjacent said plurality on nozzles for mixing fan air and nacelle air, a diffuser connected to said mixing zone for lower the velocity of the mixed air, the end of said diffuser defining an ejector for further mixing of said mixed air with nacelle air, said diffuser and said liner defining a discharge slot, said discharge slot defining a step in the surface of said sidewall for dumping mixed fan and nacelle air into the gaspath, whereby the static pressure of the gas path and the pressure and velocity of the mixed air discharging through said slot lays a blanket of cooling air adjacent the surface of said sidewalls.

8. Means for purging the nacelle of aircraft and for cooling the sidewalls of said aircraft as claimed in claim 7 wherein said plurality of ejector nozzles are supersonic.

9. Means for purging the nacelle of aircraft and for cooling the sidewalls of said aircraft as claimed in claim 8 wherein said supersonic ejector nozzles are axisymmetrical.

10. Means for purging the nacelle of aircraft and for cooling the sidewalls of said aircraft as claimed in claim 9 wherein said mixing zone is configured in a rectangle.

11. Means for purging the nacelle of aircraft and for cooling the sidewalls of said aircraft as claimed in claim 7 wherein said diffuser is rectangularly shaped in cross section.

12. For aircraft having a nacelle and an exhaust nozzle, a gas turbine engine mounted in said nacelle having attached thereto said exhaust nozzle, sidewalls adjacent said exhaust nozzle, a source of fan air from the gas turbine engine, a booster pump attached to said sidewalls upstream of the discharge end of said exhaust nozzle, first nozzle means in said booster pump driven by the fan air, a mixing chamber for mixing air in said nacelle with said fan air, a diffuser attached to said mixing chamber, a second nozzle in series flow relationship with said first nozzle means disposed on the end of said diffuser, and a step defined by said sidewall and said second nozzle for reducing the static pressure of the gaspath for laying a blanket of cooling air adjacent the exposed surface of said sidewalls whereby said nacelle is continuously being purged and said sidewalls are continuously being cooled when the gas turbine engine is in operation.

13. For aircraft as claimed in claim 12 wherein said first nozzle means comprises of a plurality of nozzles for discharging said fan air at a predetermined velocity.

14. For aircraft as claimed in claim 13 wherein said first nozzle means are axisymmetrical.

15. For aircraft as claimed in claim 14 wherein said diffuser is rectangularly configured in cross section.

* * * * *